(No Model.)  6 Sheets—Sheet 1.
C. F. PIKE.
ORE WASHER OR CONCENTRATOR.

No. 529,047. Patented Nov. 13, 1894.

Witnesses:
Arthur Ashley
Chas. F. Vanstavoren

Inventor.
Charles F. Pike
By B. J. Vanstavoren
Attorney (No Model.) 6 Sheets—Sheet 2.
C. F. PIKE.
ORE WASHER OR CONCENTRATOR.
No. 529,047. Patented Nov. 13, 1894.
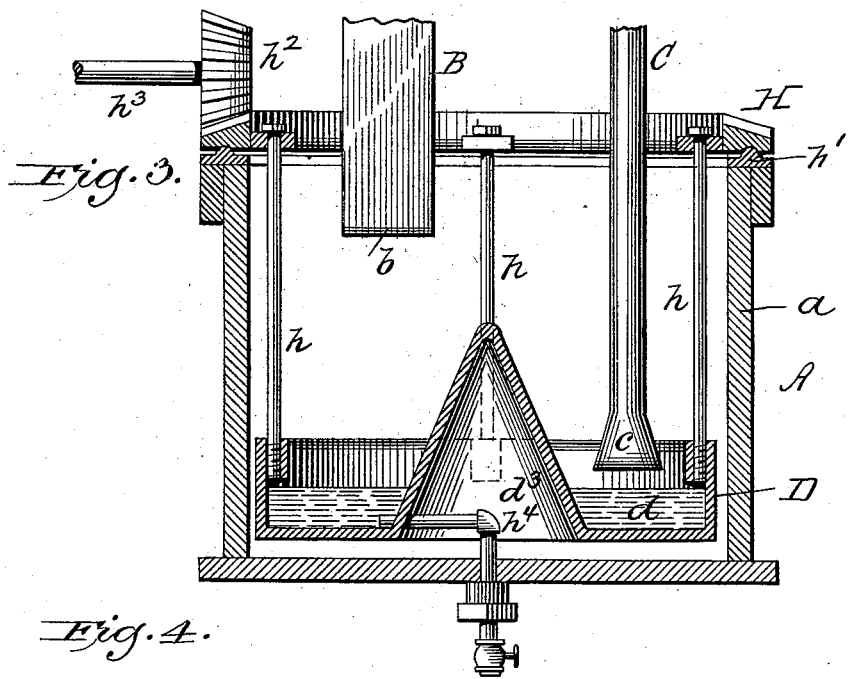
Fig. 3.
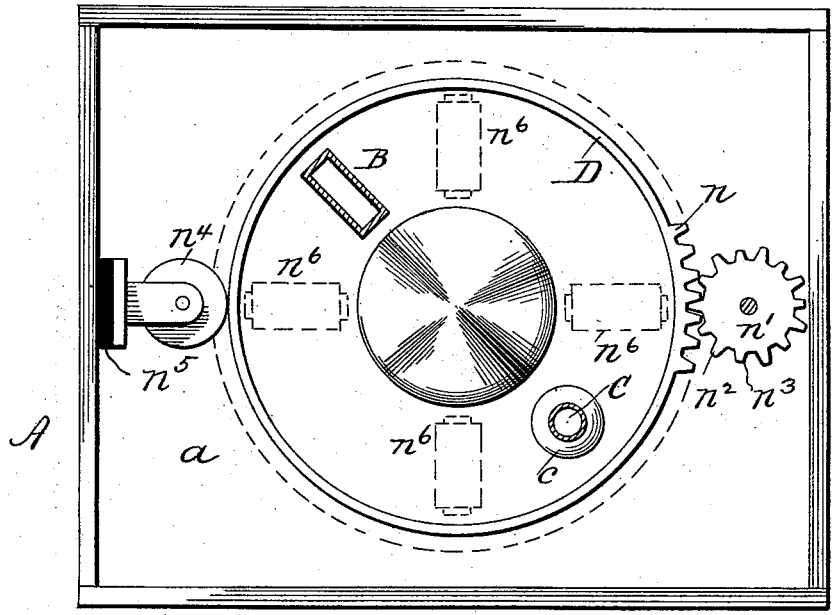
Fig. 4.
Fig. 5.
Witnesses
Arthur Ashley
Chas. F. Van Doren
Inventor.
Charles F. Pike
By C. J. Van Staveren
Attorney (No Model.) 6 Sheets—Sheet 3.
C. F. PIKE.
ORE WASHER OR CONCENTRATOR.

No. 529,047. Patented Nov. 13, 1894.

WITNESSES:
Chas. F. Van Horn
A. C. Alexander

INVENTOR
Charles F. Pike
By S. J. Van Stavoren
Attorney.

(No Model.)  6 Sheets—Sheet 4.

C. F. PIKE.
ORE WASHER OR CONCENTRATOR.

No. 529,047. Patented Nov. 13, 1894.

WITNESSES:

INVENTOR
Charles F. Pike
By S. J. Van Havorn
Attorney (No Model.) 6 Sheets—Sheet 5.
C. F. PIKE.
ORE WASHER OR CONCENTRATOR.
No. 529,047. Patented Nov. 13, 1894.
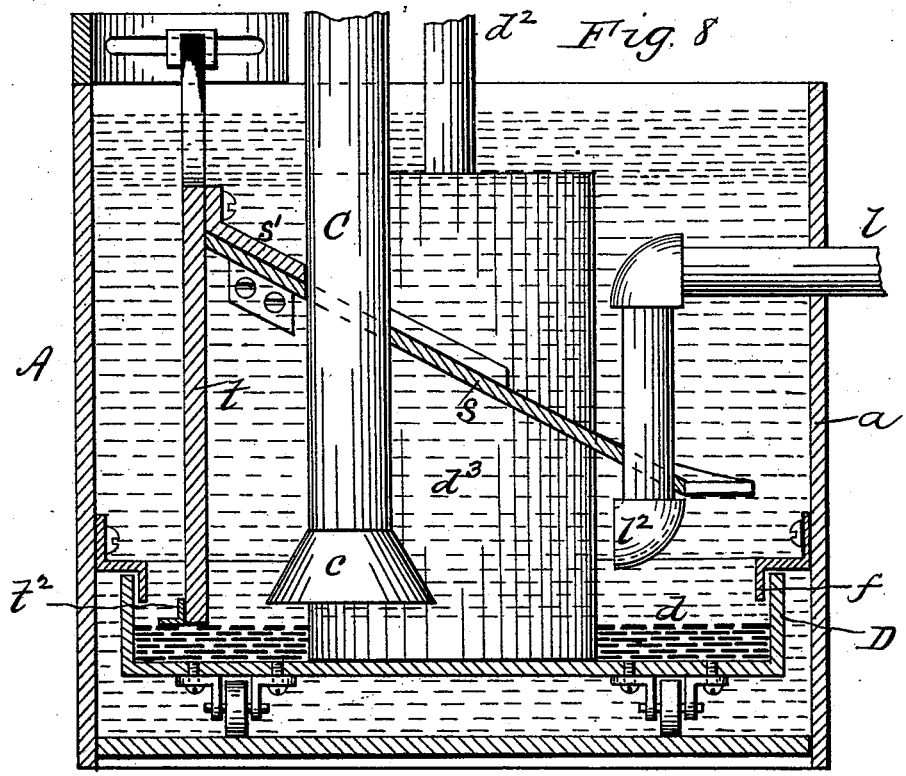
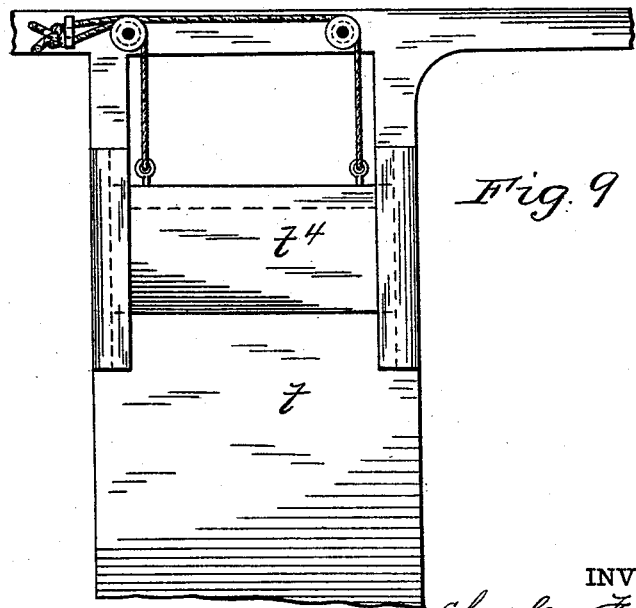
WITNESSES:
INVENTOR
Charles F. Pike
By J. Van Staavorn
Attorney (No Model.) 6 Sheets—Sheet 6.
C. F. PIKE.
ORE WASHER OR CONCENTRATOR.
No. 529,047. Patented Nov. 13, 1894.
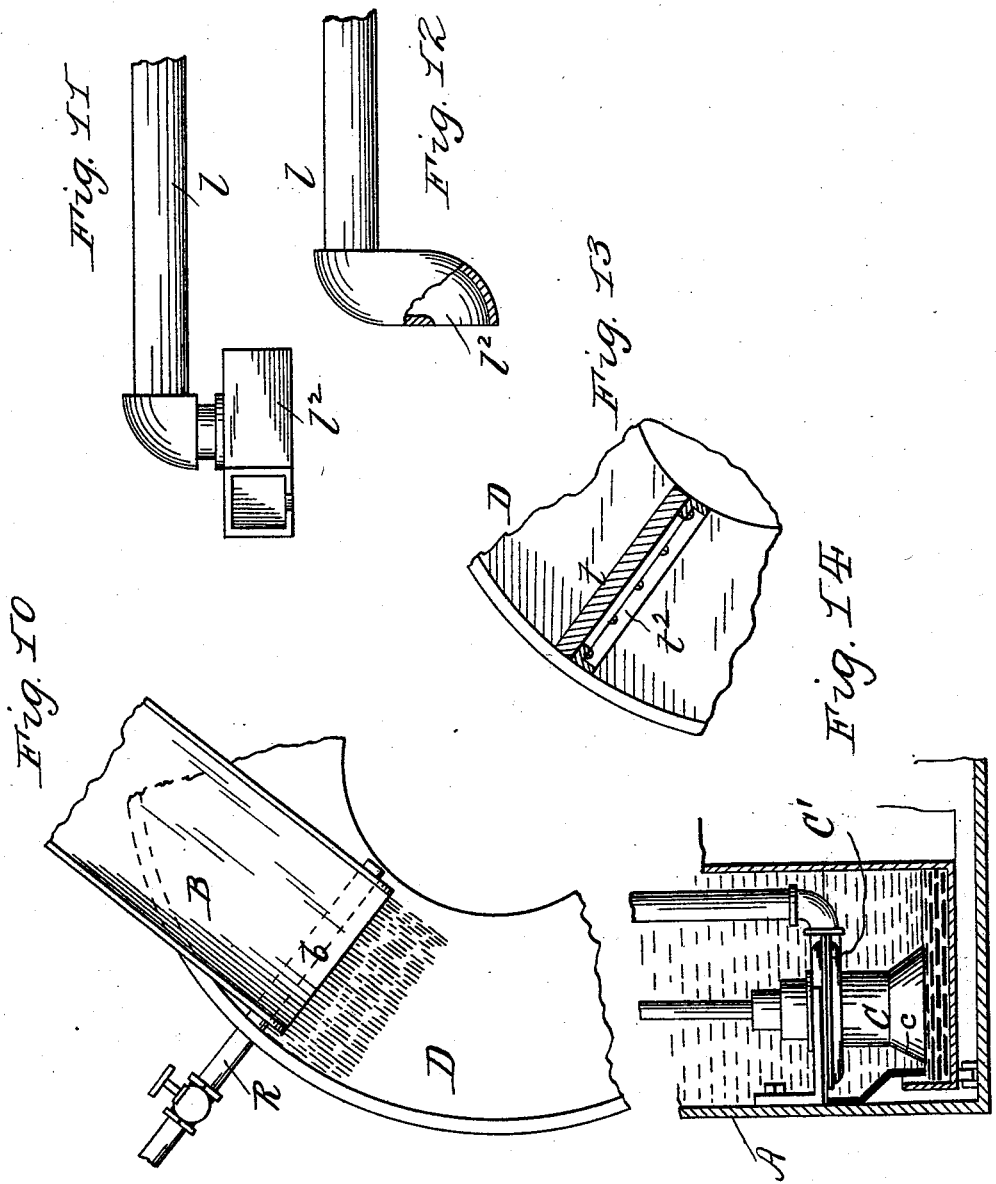
WITNESSES:
INVENTOR
Charles F. Pike
By A. J. Van Stavoren
Attorney

UNITED STATES PATENT OFFICE.

CHARLES F. PIKE, OF PHILADELPHIA, PENNSYLVANIA.

ORE WASHER OR CONCENTRATOR.

SPECIFICATION forming part of Letters Patent No. 529,047, dated November 13, 1894.

Application filed November 16, 1893. Renewed October 13, 1894. Serial No. 525,818. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Ore Washers or Concentrators; and I do hereby declare the following to be a full, clear, and exact description of the invention, such as will enable others skilled in the art to which it appertains to make and use the same.

My invention has relation generally to ore-washers and concentrators, and particularly to that type of the same having a receiving vessel for the ore, a feed device, a moving or rotating body of mercury and a suction discharge; and it has for its object simplicity of construction for rapidly and more effectually separating the metal particles from the waste matters of large quantities of ore.

My invention accordingly consists of the methods of washing or concentrating ores and of the combinations, constructions and arrangements of parts as hereinafter more fully described in the specification and pointed out in the claims.

Reference is had to the accompanying drawings, wherein—

Figure 1:
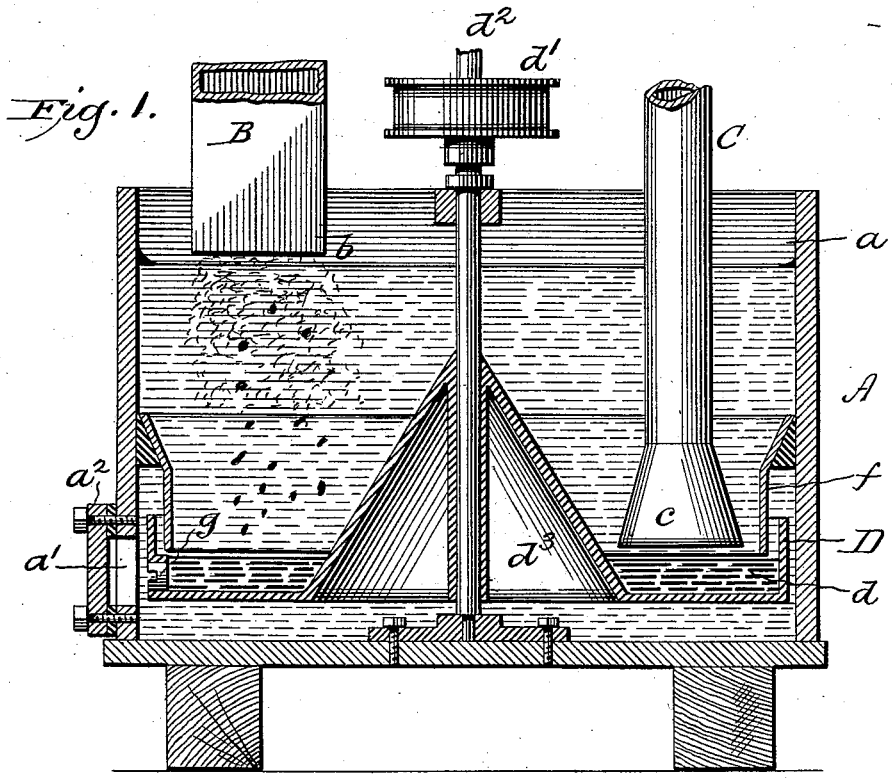
Figure 2:
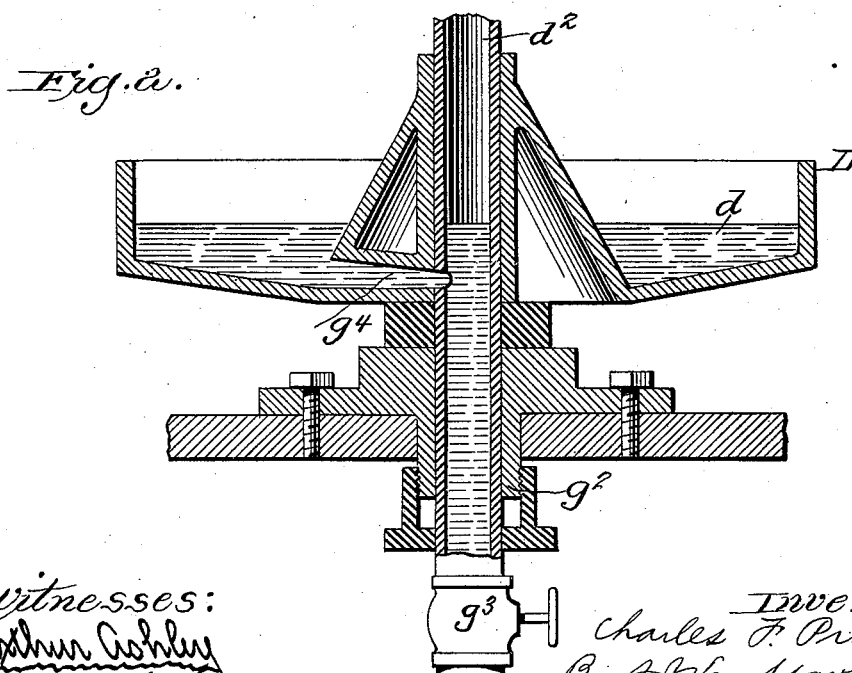
Figure 6:
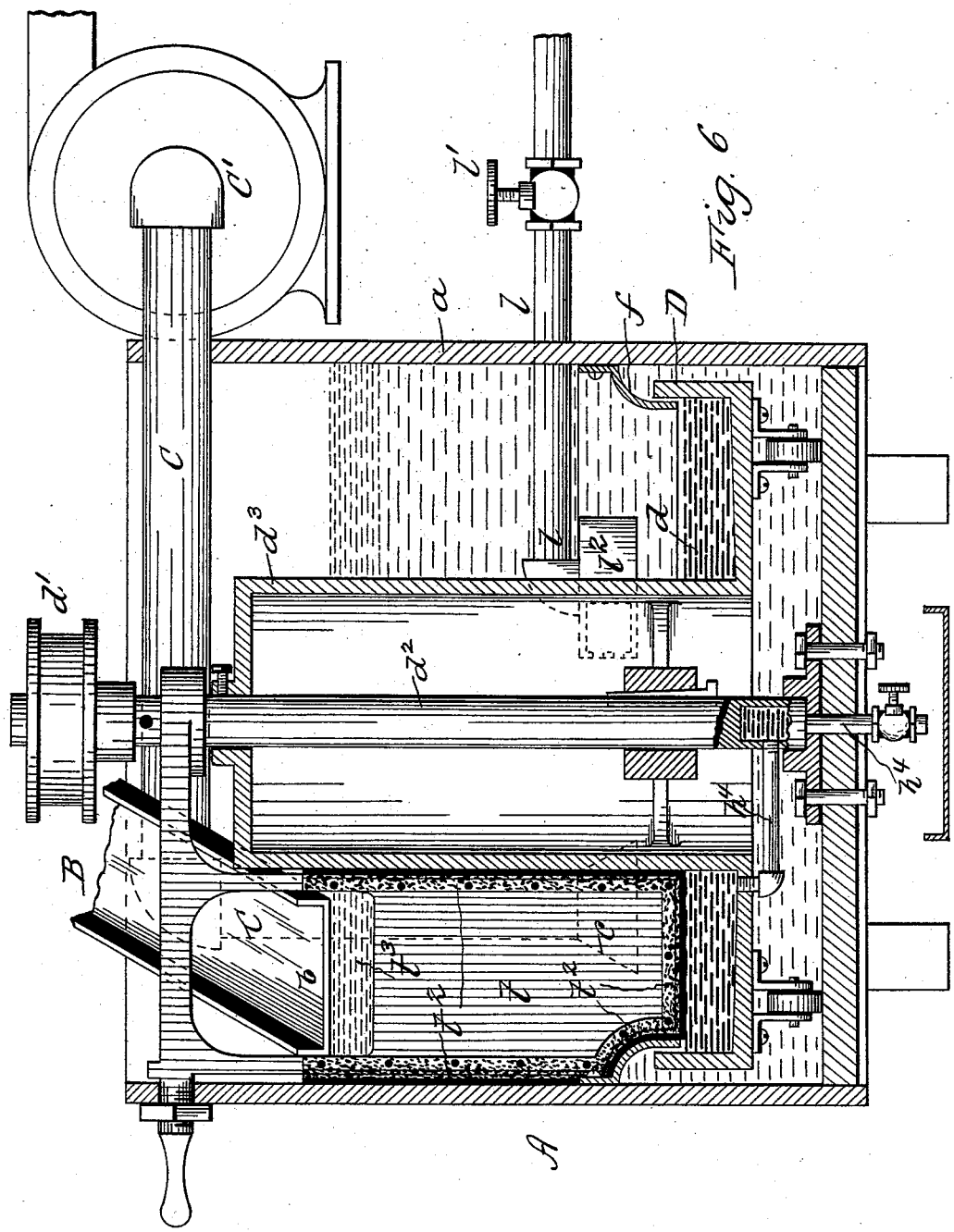
Figure 7:
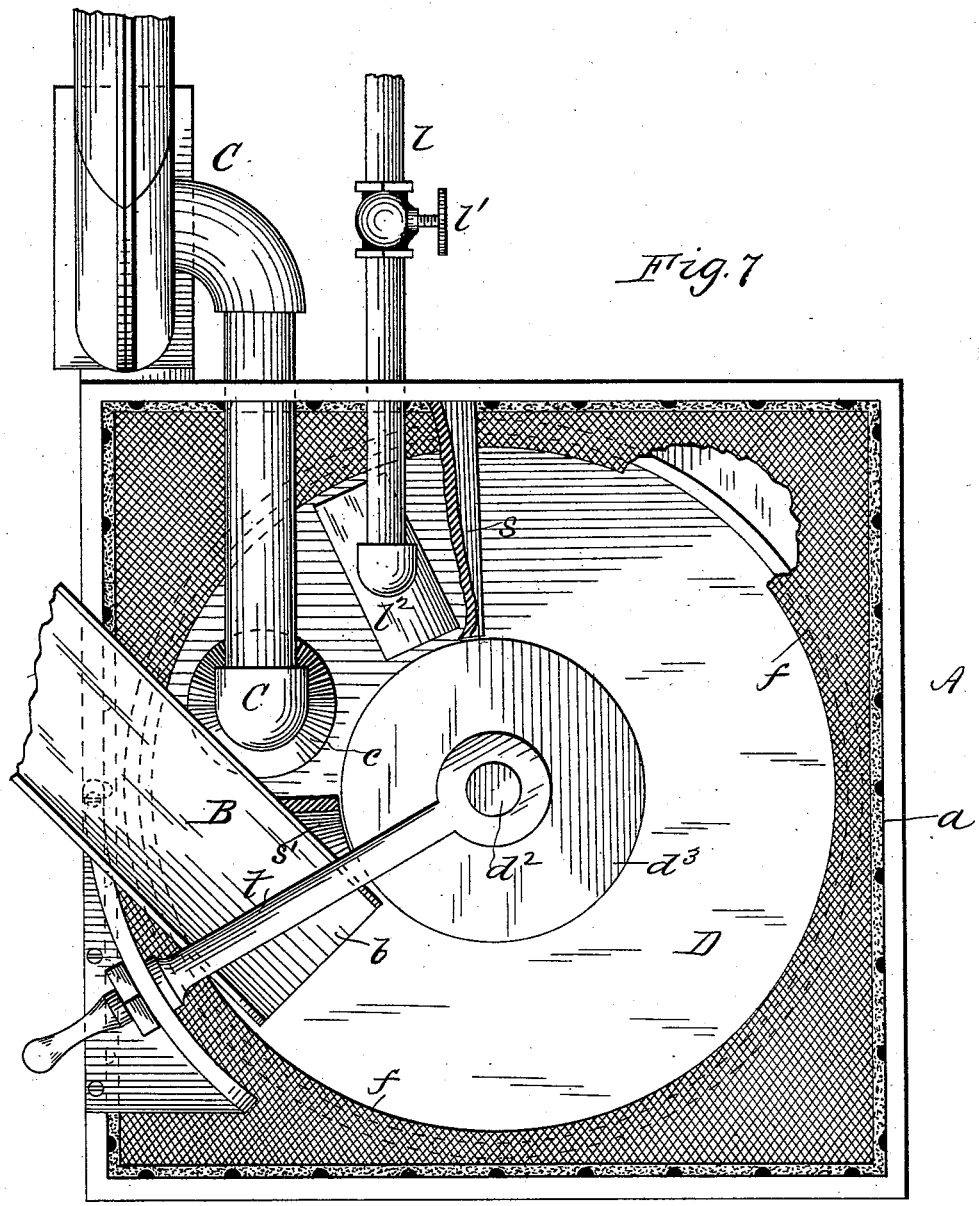

Figure 1, is a sectional elevation of a washer or concentrator embodying the simplest form of my invention. Fig. 2, is a like view, with mercury discharge pipe partly broken away, showing modification of construction and arrangement of parts of the washer or concentrator. Fig. 3, is a sectional elevation of still another modification. Fig. 4, is a partially sectional plan view of the same, showing means for shaking or jigging the rotary or moving mercury-containing vessel. Fig. 5, is a partial detail plan view illustrating a modification of construction of said means for jigging said mercury containing vessel. Fig. 6, is a sectional elevation of an ore washer and concentrator embodying the most complete form of my invention. Fig. 7, is a plan view of the same partly broken away. Fig. 8, is a view similar to Fig. 6 from a different point of view. Fig. 9, is a partial detail view in elevation, of a partition plate in the ore receiving vessel and means thereon for regulating the height of such partition. Fig. 10, is a partial detail plan view, showing a jet-tube at the exit end of the feeding flume or trough for the washer or concentrator. Figs. 11 and 12, are detail views, respectively an elevation and an elevation partly broken away, of different forms of jet-supply-tubes for the ore washer or concentrator for location adjacent to the suction discharge. Fig. 13, is a detail plan view of mercury-containing vessel and a horizontal section of the receiving-vessel-partition, and Fig. 14, is a detail sectional elevation showing the suction pump located within the ore washer or concentrator below the water level thereof.

A represents the ore washer or concentrator which as illustrated in the drawings is composed of a receiving-vessel $a$ of any suitable form which has a fixed position and is provided with any suitable form of feed chute or device B, suction discharge device C and a rotating or movable vessel D containing mercury $d$. The latter may be of any suitable form and any suitable actuating devices $d'$ may be employed for rotating or moving it.

In Fig. 1 the vessel D is shown mounted on shaft $d^2$ to rotate with said shaft and is provided with a central-hub $d^3$ to make said vessel trough-shaped. Overlapping the edges of vessel D is a depending flange $f$ of flexible or other suitable material which is suitably fastened to the walls of vessel $a$ as desired. The exit end $b$ of the feed chute B may be located as desired. In the drawings it is shown located near the top of the vessel $a$ so that the ore escaping therefrom may have a drop or fall of a considerable distance or extent. The inlet end $c$ of the discharge C is located adjacent to the surface of the mercury in vessel D; or it may have any other suitable location as the requirements of service demand.

In Fig. 1 the vessel D is provided with an outlet plug $g$ and the vessel $a$ has an opening $a'$ with removable sealed cover $a^2$ for drawing off the amalgam from vessel D as desired.

In Fig. 2 the shaft $d^2$ is represented as a hollow shaft having a lower stuffing-box bearing $g^2$; said hollow shaft having a drip cock or valve $g^3$ and a communication $g^4$ with the mercury $d$ in vessel D for drawing off the amalgam therefrom as desired.

In Fig. 3 the vessel D is shown supported by rods $h$ depending from a gear wheel H having bearings $h'$ on the top of vessel $a$ and driven by a wheel $h^2$ on a counter-shaft $h^3$; said vessel D communicating with a drain pipe $h^4$ located in the axial line of rotation of vessel D and rotating with it, which pipe is provided with a cock and suitably constructed stuffing-box bearing as shown.

In Fig. 4, the vessel D is shown provided with a gear $n$ driven by a counter-gear $n'$ having alternate long and short teeth $n^2$ $n^3$ respectively so as to jig or shake the vessel D as it is rotated; suitable roller bearings $n^4$ with yielding supports $n^5$ being provided at one side of the vessel to admit of its lateral movement when subjected to such actuating shaking devices; said vessel D being mounted upon suitable roller or other analogous bearings $n^6$.

In Fig. 5 the alternate long and short teeth on the counter gear $n'$ are dispensed with and in lieu thereof alternate teeth of different depths on the vessel D are substituted.

The provision of the stationary vessel $a$ containing water suitably applied thereto with the ore fed to chute B or by a separate supply pipe $l$ having a regulating cock $l'$, see more plainly Figs. 6 and 7, and the moving or rotating mercury containing vessel, admits of using any desired depth or fall in vessel $a$ for the drop or fall of the ore through it to the mercury in vessel D, as the deeper the water in vessel $a$ is, the greater the extent of fall of the ore from chute B to mercury vessel D, and the more the fall within serviceable limits the greater the velocity of descent of the metal particles relatively to that of the lighter or waste particles, so that such metal particles fall to and are amalgamated in vessel D before the lighter particles complete their descent to vessel D.

The use of the large or deep stationary body of water in vessel $a$ and the rotation of the mercury vessel D only, requires less power to operate the washer or concentrator.

In Figs. 6, 7, and 8 the vessel $a$ is provided on one side with a vertically located partition $t$, on one side of which the discharge C, and on the other the feed B, are located. This admits of the discharge being located as close to the feed as possible without subjecting any of the incoming feed or ore to the influence of the discharge, and a longer distance of travel is provided for the feed in vessels $a$ or D before the ore or its waste products come within the field of force of the discharge. The edges of the partition $t$ are provided with flexible or packing flaps or flanges as indicated at $t^2$ for sealing the feed side of vessel $a$ from its discharge side.

To avoid depositing the feed in the vessel $a$ so that such feed will heap or pile up at the location of the feed, a suitable or desired depth of the water in vessel $a$ at its top is circulated or caused to be set in motion for carrying the feed from its place of deposit in vessel $a$ around or through it toward the place of discharge. To effect this circulation of the top layer of water in vessel $a$ the upper part of the partition $t$ is cut away as desired below the level of the water in said vessel as indicated at $t^3$ and the feed chute B is suitably led through the upper part of said opening $t^3$ above the level of the water in vessel $a$ to feed thereto at a tangent as illustrated, or otherwise as desired. Such line of feeding causes the top layer of water in vessel $a$ to circulate for carrying the ore around in said vessel away from the place of its deposit from chute B. The depth of such circulation is controlled by the extent of opening $t^3$ in partition $t$ and if desired a suitably mounted and adjustable valve or gate $t^4$ may be provided on partition $t$ for regulating the depth of such top circulation of water in vessel $a$, as more plainly shown in Fig. 9. Below such circulating water, the body of water in vessel $a$ is quiescent and below the latter the moving or rotating mercury is located which not only recovers the metal from the ore but carries the waste matters to the discharge.

To prevent any particles of metal being discharged along with the waste matters, a downwardly inclined shed or chute $s$ is provided in vessel $a$ at the discharge end of the same. This shed may be in one piece or in sections, the section $s'$ of which is attached to and moves with partition $t$ when it is adjustable to and from the discharge C as shown more plainly in Fig. 8.

The water supply pipe $l$ may be suitably located as desired, but in the drawings it is shown with its nozzle end $l^2$ located adjacent to the discharge pipe B to loosen, agitate and wash the waste-matters on the surface of the mercury as they approach the field of force of the suction discharge.

Any suitable mounting for partition $t$ and adjusting mechanism therefor may be used.

If desired suitable jet-pipes R may be located at or adjacent to the location of deposit of feed in vessel $a$ for assisting in the formation or production of the top circulation of water in vessel $a$. A form of such jet tubes is shown in Fig. 10.

From the foregoing it will be noted that a large depth of water is provided for the ore to fall through before reaching the mercury, which depth of water does not add to the expense of operating the machine; that on the contrary the running cost of the same is reduced; and that, such water being stationary, the rapidity of rotation or movement of the mercury containing vessel may be increased to enlarge the out-put of the machine; that such increase of out-put is also more effectually provided for by sealing the inlet or feed side of the washer from the discharge side of the same to bring such feed and discharge devices or ends nearer together and thereby lengthen the distance or travel of the mercury from the feed to the discharge to a maximum; that the feed is deposited in a circulating stratum of water for distributing it in the washer; that such distributed feed falls or drops from a circulating stratum of water or one in motion to a quiescent stratum, passing through the latter to a moving body of mercury. The ore, therefore, is first thoroughly agitated or distributed; and then removed from such agitating or distributing influences to admit of its gravity action exerting its full falling force in advance of its contact with the mercury, thereby effecting a most thorough and rapid washing or concentration of the metal from the waste particles of the ore.

The weight of the deep body of quiescent water on the mercury in vessel D exerts a rubbing action thereon to keep the surface of the mercury always bright and further produces a rubbing, rolling or riffling action of such surface to mix the mercury for presenting constantly a new surface, and for effecting a continuous pressing of the metal particles into the mercury.

In Fig. 6 the suction pump C' for the suction discharge pipe C is represented located outside of the vessel A; but if desired such pump may be located within said vessel below its water line as indicated in Fig. 14. The advantage of this last described location is, that the usual tube with valve connection for charging the pump preparatory to starting it, and commonly called charging appliances for the pump are then dispensed with and the vacuum-lift or the lifting work of the pump is minimized thereby diminishing the cost of the plant and the running expense. The said charging appliances are always part of the pump when it is a lifting pump or when it is located above the level of the water it acts upon.

I have described that the vessel D contains a layer of mercury which may be of any depth desired. Thus for instance it may be fluid-mercury of more or less depth as indicated in the drawings or it may be a mere stratum or film of mercury spread upon or caused to adhere to the vessel D. So too while I have described the mercury arranged to be movable as a preferable form in the washer shown, yet it is obvious that under other requirements of service the mercury may be differently arranged to meet such requirements, the essential feature of the invention comprising feeding the ore into a stratum of circulating or moving water then causing it to pass through a stratum or body of quiescent water, then amalgamating the metal of the ore and then discharging the waste matters.

What I claim is—

1. The method herein described of washing and concentrating ore, which consists in feeding the ore into a depth of still or quiescent water to admit of the metal particles of the ore falling through the water faster than the waste matters, then subjecting the metal particles and waste matters to the action of a moving body of mercury at the termination of their descending movement, and then discharging such waste matters, substantially as set forth.

2. The method herein described of washing or concentrating ore, which consists in feeding the ore into a stratum or body of circulating or moving water, then causing it to pass through a stratum or body of quiescent water beneath said circulating water, and then subjecting it to the action of a moving body of mercury, substantially as set forth.

3. The method herein described of washing or concentrating ore, which consists in feeding the ore into a top stratum of circulating or moving water which agitates and distributes such ore, then causing said ore to pass from and drop through a body of quiescent water, then subjecting such ore to the action of amalgamation, and then discharging the waste matter, substantially as set forth.

4. In an ore washer, the combination of a receiving vessel adapted to contain a body of water, a layer of mercury in said vessel, means for producing a movement or circulation in the top stratum of water and causing the stratum of water above the mercury to remain quiescent, a feed device, and a suction discharge device, substantially as set forth.

5. In an ore washer or concentrator, the combination of a receiving vessel adapted to contain a body of water, a movable layer of mercury, means for moving said mercury, means for producing a movement or circulation in the top stratum of water and causing the stratum of water above the mercury to remain quiescent, a feed-device, and a suction discharge, substantially as set forth.

6. In an ore washer or concentrator, the combination of a receiving vessel adapted to contain a body of water, a rotating device with mercury in said vessel, a partition in said vessel extending from the level of the mercury to below the top of the water in the receiving vessel for causing the stratum of water above the mercury to remain quiescent and admit of the stratum of water above the top of the partition moving or circulating, substantially as set forth.

7. In an ore washer or concentrator, the combination of a stationary vessel containing a body of water, a rotating mercury containing-vessel in said stationary vessel, a feed-device, and a suction-discharge, substantially as set forth.

8. In an ore washer or concentrator a receiving-vessel adapted to contain a body of water, a partition extending from above the bottom of the receiving vessel to below the level of the water contained therein, substantially as set forth.

9. In an ore washer or concentrator a receiving vessel adapted to contain a body of water a partition $t$, and an adjustable gate on said partition, substantially as set forth.

10. In an ore washer or concentrator, a receiving vessel having a suction discharge, and a feed device sealed from said suction device, substantially as set forth.

11. In an ore washer or concentrator, a receiving vessel having a feed device, a suction discharge, and a chamber inclosing the inlet end of said suction discharge, substantially as set forth.

12. In an ore washer or concentrator, the combination of a receiving vessel a suction device, a feed device, a partition between said device, and a shed or cover for the suction discharge, substantially as set forth.

In testimony whereof I affix my signature in presence of two witnesses.

CHARLES F. PIKE.

Witnesses:
JOHN RODGERS,
LOUIS E. PIKE.